W. L. SCHELLENBACH.
WORK SECURING MECHANISM.
APPLICATION FILED JULY 15, 1914.
1,133,064.
Patented Mar. 23, 1915.
2 SHEETS—SHEET 1.
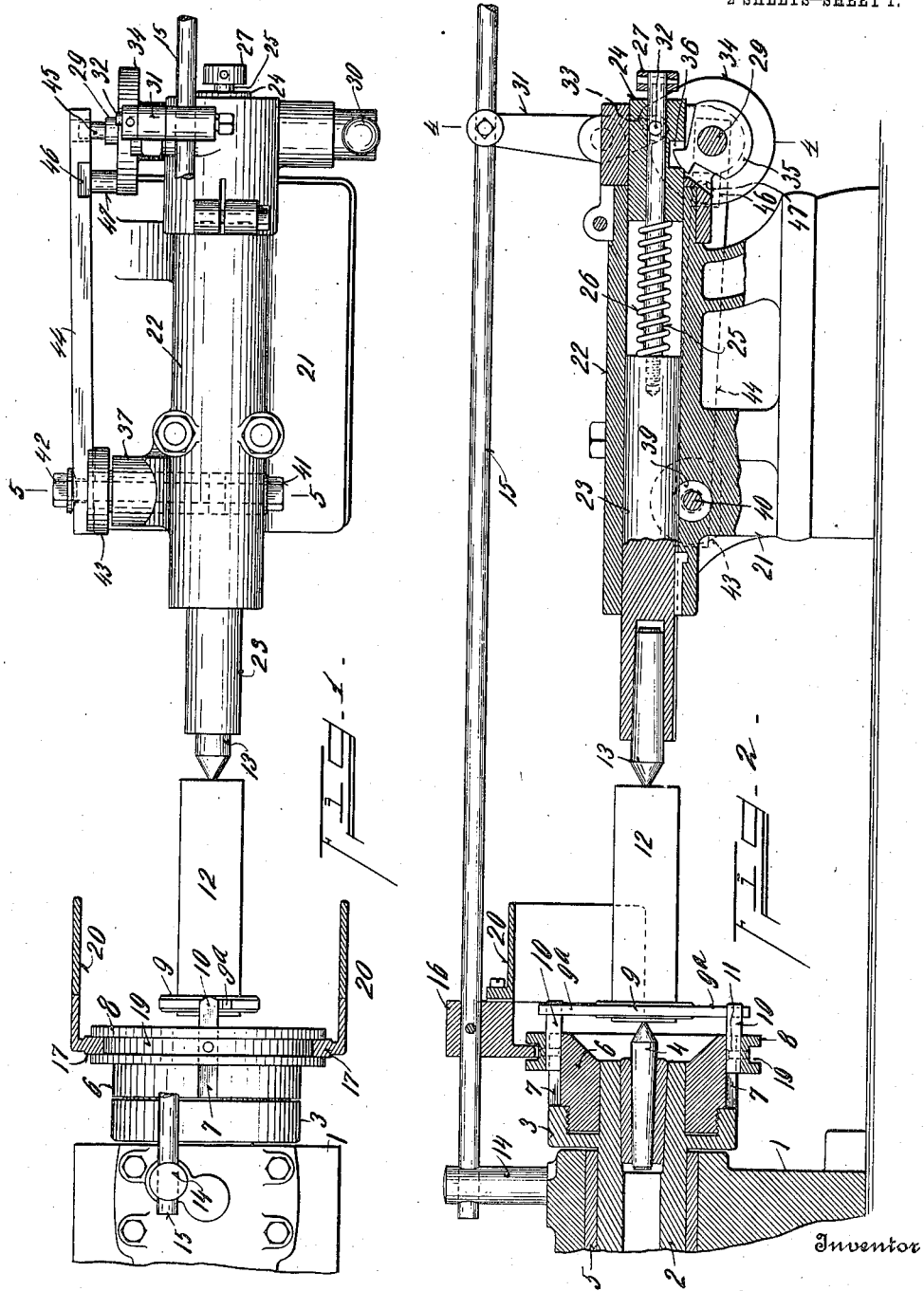

W. L. SCHELLENBACH.
WORK SECURING MECHANISM.
APPLICATION FILED JULY 15, 1914.
1,133,064.
Patented Mar. 23, 1915.
2 SHEETS—SHEET 2.
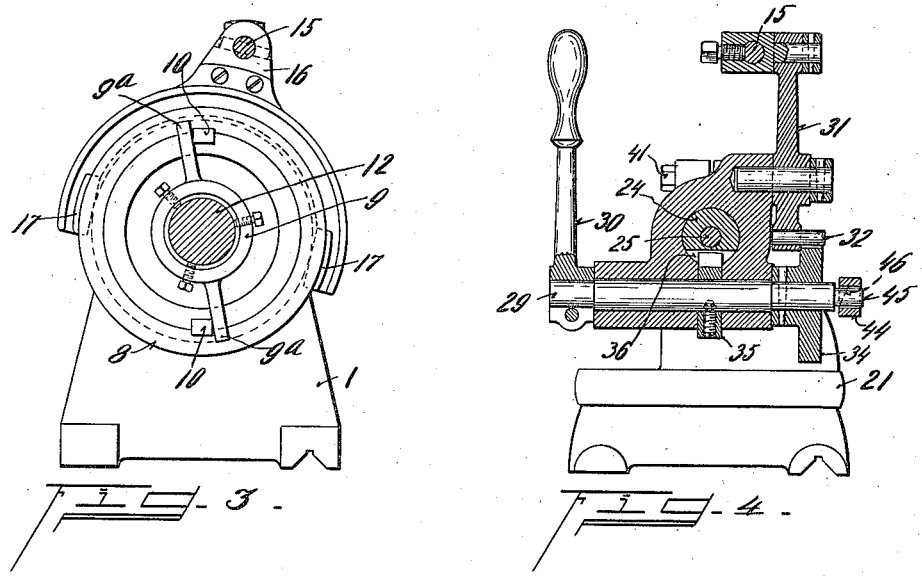
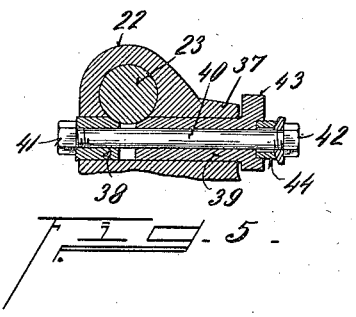

UNITED STATES PATENT OFFICE.

WILLIAM L. SCHELLENBACH, OF HARTWELL, OHIO.

WORK-SECURING MECHANISM.

1,133,064.

Specification of Letters Patent.  Patented Mar. 23, 1915.

Application filed July 15, 1914.  Serial No. 851,221.

*To all whom it may concern:*

Be it known that I, WILLIAM L. SCHELLENBACH, a citizen of the United States, residing at Hartwell, in the county of Hamilton and State of Ohio, have invented a new and useful Improvement in Work-Securing Mechanism, of which the following specification is a full disclosure.

This invention relates to an improvement in lathes and deals more particularly with work engaging and driving devices forming elements of the head and tail-stocks thereof.

One of the objects of the invention is to provide a translatory, rotative work engaging and driving member translated coördinately with the longitudinal movements of the tail-stock spindle to sequentially move said spindle and work driving member toward and from a work engaging position without stopping the machine.

Another object is to provide a tail-stock spindle translated by an operating member having a uniform stroke and provided with compensating means effective during a movement to a work engaging position.

Another object is to provide a translatory rotative work engaging and driving member translated coördinately with the movements of the tail-stock spindle and means for locking said spindle in its work engaging position, all operated by a single operating handle, while the machine is in constant operation.

Another object is to provide means for operating the tail-stock center or spindle coördinately relative to the functioning of the work engaging member.

Another object is to provide a means for sequentially translating the tail-stock spindle and work engaging and driving member toward and from each other while the machine is in constant operation to engage and disengage the work, thereby permitting a removal of a piece of finished work and the chucking of a new piece of work without stopping the machine.

In the drawings, forming a part of this specification, is shown the principle of the invention as it is to be embodied in a typical lathe organization, although the selected application is not an inherent limitation of the invention, and in which drawings, Figure 1 is a top plan view. Fig. 2 is a central vertical section. Fig. 3 is an elevation of the face of the head-stock. Fig. 4 is a section on line 4—4, Fig. 2. Fig. 5 is a detail section on line 5—5, Fig. 1.

The head-stock 1, has the driven spindle sleeve 2, on the end of which is the internally threaded spindle nose 3, the live center 4 being secured in an end of the spindle sleeve bore. The usual bearing sleeve 5 is provided, in the head-stock, and an annular work dog seat 6 is screw threaded into the spindle nose. The outer periphery of the seat 6 is formed with the long.tudinal splines 7, an externally grooved annulus 8 is supported on seat 6. The work dog 9 has the radial arms 9ª for engaging studs 10 operating in the seat splines 7 and secured to the annulus 8 by pins 11, whereby the dog 9, its arms 9ª, and the studs 10 rotate as a unit, the annulus 8 being longitudinally movable relative to the seat 6, which is fixed to the spindle nose, the work 12 being concentrically secured in the dog 9, and the ends of the work being centered on the head-stock live center 4 and the tail-stock center 13. On the head-stock is a bearing post 14 longitudinally slidably supporting the operating rod 15. On said rod 15 is a block 16, from which depends a stirrup 17 engaging into the groove 19 of rotating annulus 8 so as to reciprocate said annulus and studs on the rotating seat 6, when rod 15 is appropriately shifted. Also preferably, from block 16 is depended a semi-cylindrical shield 20 partly enveloping the head-stock end of the work bar 12. The tail-stock 21 has the spindle sleeve 22, in which is the spindle stem 23 carrying the center 13, said stem being longitudinally adjustable in sleeve 22, and clamped therein by mechanism controlled concurrently with the operation of rod 15, against rotatable or longitudinal motion. In the rear end of sleeve 22 is a reciprocating member 24, through which passes a pin 25 screw threaded into the rear end of stem 23, a spring 26 being held on said pin within the sleeve 22 and the ends of the spring abutting the opposing ends of stem 23 and member 24, the pin having a head 27 coacting with the outer end of member 24, said member and pin having relative longitudinal motion, whereby the member in sliding over the pin as an axis, appropriately applies or releases the tension of spring 26, and thereby advances or retracts spindle stem 23 for engaging or disengaging the work 12.

To positively operate the member 24, and for concurrently operating the rod 15 and the tail-stock spindle clamp, the following actuating mechanism is provided:—In the rear end of the tail-stock is a rock shaft 29 transverse to the spindle and having an operating handle 30. A rock lever 31 is intermediately fulcrumed on the upper, rear portion of the tail-stock, to the upper end of which is secured the rear end of rod 15, so that as lever 31 is appropriately rocked the rod 15 will be advanced or retracted to reciprocate the work dog engaging studs on the driven or head-stock spindle. The lower end of lever 31, has a pin 32, engaged by a shoulder 33, on a rock disk 34, fixed to rock shaft 29, whereby the operation of actuating shaft 29 controls the shift of rod 15, and hence longitudinally reciprocates the work dog engaging studs 10 relative to the head-stock spindle. The under medial portion of the rear end of the tail-stock sleeve is cut out to give access to the mechanism for reciprocating member 24, which comprises a rock detent member 35 fixed to the medial portion of shaft 29, and coacting with the indent 36 in the under side of the reciprocating tail-stock actuator 24. Therefore, when shaft 29 is appropriately rocked it longitudinally shifts the annulus 8 and dog engaging studs 10, and concurrently operates member 24, to apply or release endwise tension on the tail-stock spindle stem 23, thereby advancing or retracting the tail-stock spindle 23 appropriately to the movement of the annulus 8, for securing or releasing work between the live and dead centers. That is, in the position shown in Fig. 1, member 24 is at the forward end of its shift, spring tension being applied on the end of the tail-stock spindle stem to advance the spindle 23 into work engaging position, and at the same time member 34 has shifted rod 15 in the opposite direction to appropriately advance the annulus 8, so that its studs 10 engage on opposite sides of the work dog arms 9ª. On the reverse movement of shaft 29, lever 33 and rock member 34 will shift rod 15 toward the head-stock to release the studs 10 from engagement with dog arms 9ª, and at the same time, detent member 35 will engage the rear shoulder of indent 36, shifting member 24 rearwardly until its end strikes the pin-head 27, whereby the spindle 23 will be positively retracted to disengage the work. But it is also necessary to concurrently actuate the tail-stock spindle clamp, which clamping and actuating mechanism comprise a transverse bearing sleeve 37 on the under side of the forward portion of the tail-stock in which are sleeves 38, 39, for clamping the tail-stock spindle stem 23, said sleeves being connected by bolt 40, having outer heads 41, 42, respectively. The sleeve 39 has a head 43, and between the bolt and sleeve heads 42, 43, is loosely secured the forward end of a clamp actuating rod 44, so that as said rod is appropriately moved in a horizontal plane, the clamp sleeves 38, 39, are drawn together or moved away from one another to clamp or unclamp the tail-stock spindle. The rod 44 is rearwardly extended and supported movably on the projecting end 45 of rock shaft 29. Near this end of rod 44 is formed a cam slot 46, into which is coactively projected a pin 47 from the rear face of rock disk 34, so that an appropriate movement of shaft 29 cams the rear end of rod 44 outwardly on shaft end 45, thereby tensionally actuating the forward end of said rod relative to the sleeve and clamp-bolt heads 42, 43, to draw the sleeves together or move them apart for clamping or unclamping the tail-stock spindle stem, and this function is effected coördinately with and appropriate to the movements of the work dog studs and the longitudinal movements of the tail-stock spindle 23, thus enabling the work dogs engaging studs and the tail-stock spindle to be positioned and the tail-stock spindle clamp to be coördinated by an appropriate movement of handle 30, for inserting or removing a dog-secured work bar, and without the necessity of stopping the head-stock drive. The pin and spring having relative longitudinal motion to the positively reciprocating actuator for the tail-stock spindle positioning, provides an automatic compensation enabling the securance of different length work between centers without manual relative longitudinal adjustment of the head or tail-stock, or their spindles. Thus in securing work a given primary actuation is concurrent relative to all three mechanisms functioning under the single control, but the coaction is coördinate, in the sense that the effective functions are sequential or operative in timed movements, to first longitudinally and automatically position the tail-stock spindle for centering the work, second, to clamp the tail-stock in work engaging position, and third, shift the dog engaging device. Although the timed intervals are slight, they are functionally effective at three distinct periods in the rotation of the primary, common controlling rock shaft 29, while for releasing the work the sequential order is to first release the dog drive, second to unclamp the tail-stock spindle, and third, to retract the tail-stock spindle.

Having described the invention, I claim:—

1. In a device of the class described, in combination with a driven head-stock, spindle, a tail-stock and its spindle, an annulus to be translated on the head-stock spindle, a work dog engaging device on said annulus, and means operated from the tail-stock for translating said annulus.

2. In a device of the class described, in combination with a head-stock, its driven spindle, and a tail-stock and its spindle, a work dog engaging device at the head-stock adapted to be translated thereon, and means on the tail-stock for translating said device.

3. In a device of the class described, a head-stock spindle, a tail-stock spindle, tail-stock operating means, an externally grooved annulus to be translated on the head-stock spindle, a work dog engaging device on the annulus, and longitudinally shifting means engaging the annulus groove to translate the same while in rotation, said shifting means being extended to the tail-stock and connected to the tail-stock operating means, for coördinately operating the work dog engaging device and the tail-stock spindle.

4. In a device of the class described, a head-stock spindle, a member to be translated thereon, a work dog engaging device on said member, a tail-stock, a spindle to be translated thereon, and means for coördinately translating said member and tail-stock spindle while the head-stock spindle is in operation.

5. In a device of the class described, a head-stock driven spindle, a work dog engaging device fixed to rotate with and move longitudinally of the spindle, a tail-stock, a spindle to be reciprocated therein, and means for coördinately operating said device and tail-stock spindle while the head-stock spindle is in motion.

6. In a device of the class described, in combination with head and tail-stock spindles, the head-stock spindle being driven and the tail-stock spindle longitudinally adjustable, a work dog engaging device fixed to rotate with and move longitudinally of the head-stock spindle, and means for coördinately moving the said device and tail-stock spindle into or out of position for engaging the dog-operated work.

7. In a device of the class described, in combination with head and tail-stock spindles, the head-stock spindle being driven and the tail-stock spindle longitudinally adjustable, a work dog engaging device fixed to rotate with and move longitudinally of the head-stock spindle, and means on the tail-stock for coördinately moving the said device and tail-stock spindle into or out of position for engaging the dog-operated work.

8. In a device of the class described, in combination with head and tail-stock spindles, a work dog engaging device fixed to rotate with and move longitudinally of the head-stock spindle, the tail-stock being longitudinally adjustable, means for locking the tail-stock spindle in adjusted position, and means for coördinately operating the said device, tail-stock spindle adjustment, and tail-stock clamping mechanisms.

9. In a device of the class described, in combination with a head-stock and its live spindle, and a tail-stock with a dead spindle longitudinally adjustable therein, a member fixed to rotate with and reciprocate longitudinally of the live spindle, means for adjusting the tail-stock spindle, means for locking the tail-stock spindle, means for coördinately adjusting said live spindle device, said tail-stock spindle and for locking said tail-stock spindle, and an actuator common to said coördinated operating mechanisms.

10. In a device of the class described, in combination with the head-stock and its live spindle, and with a tail-stock having a longitudinally adjustable dead spindle, a work dog engaging device fixed to rotate with and move longitudinally of the live spindle, means for adjusting the tail-stock spindle, means for shifting the said live spindle device, mechanism between said shaft and the device shifting means, and mechanism between said shaft and said tail-stock spindle adjusting means, said mechanisms being arranged to coördinately operate said device and tail-stock spindle to engage or disengage the dog-secured work.

11. In a device of the class described, a tail-stock having a longitudinally adjustable spindle, an actuator for the spindle, a spindle clamp mechanism, a rock shaft having a member for reciprocating said actuating member, a clamp actuating rod, and a device on said rock shaft for caming the actuating rod.

12. In a device of the class described, a head-stock and its live spindle, a tail-stock having a longitudinally adjustable spindle, a work dog engaging device fixed to rotate with and reciprocate on the head-stock spindle, a rod for shifting said device while the spindle is in rotation, a rock shaft in the tail-stock, a member actuated by said shaft for adjusting the tail-stock spindle, or tail-stock spindle clamp, a rod for operating said clamp, a member on said rock shaft for operating the shift rod to the head-stock, and a member on said rock shaft for operating said clamp actuating rod for the tail-stock spindle.

13. In a device of the nature disclosed comprising a tail-stock having a longitudinally adjustable, work-engaging, dead spindle, a reciprocating spindle actuating member having a uniform stroke within the tail-stock, a compensating means for transmitting the movement of the actuating member to the spindle to advance said spindle to a work engaging position to subsequently absorb excess movement of the actuating member.

14. In a device of the nature disclosed comprising a tail-stock having a longitudinally adjustable, work-engaging dead spindle, a reciprocating spindle actuating member having a uniform stroke, a compensating means for transmitting the movement of the actuating member to the spindle to advance said spindle to a work engaging position to subsequently absorb excess movement of the actuating member, and means for clamping said spindle in work engaging position.

15. In a device of the nature disclosed comprising a tail-stock having a longitudinally adjustable, work-engaging, dead spindle, a reciprocating spindle actuating member having a uniform stroke, a compensating means for transmitting the movement of the actuating member to the spindle to advance said spindle to a work engaging position to subsequently absorb excess movement of the actuating member, and means for clamping said spindle in work engaging position, and a common actuating means for coördinately functioning both devices.

16. In a device of the nature disclosed comprising a tail-stock having a longitudinally adjustable, work-engaging, dead spindle, a reciprocating spindle actuator having a uniform stroke, and a spring for transmitting the movement of the actuator to the spindle to advance said spindle to a work engaging position and to be subsequently tensioned by excess movement of said actuator to compensate for the difference in the length of actuator stroke and the stroke of the spindle to work engaging position.

17. In a device of the nature disclosed comprising a tail-stock having a longitudinally adjustable, work-engaging, dead spindle, a reciprocating spindle actuator having a uniform stroke, and a spring for transmitting the movement of the actuator to the spindle to advance said spindle to a work engaging position and to be subsequently tensioned by excess movement of said actuator to compensate for the difference in the length of actuator stroke and the stroke of the spindle to work engaging position, and means for clamping the spindle in work engaging position.

18. In a device of the nature disclosed comprising a tail-stock having a longitudinally adjustable, work-engaging, dead spindle, a reciprocating spindle actuator having a uniform stroke, and a spring for transmitting the movement of the actuator to the spindle to advance said spindle to a work engaging position and to be subsequently tensioned by excess movement of said actuator to compensate for the difference in the length of actuator stroke and the stroke of the spindle to work engaging position, means for clamping the spindle in work engaging position, and a common actuating means for coördinately functioning both devices.

19. In a device of the nature disclosed comprising a tail-stock having a longitudinally adjustable dead spindle, a reciprocating spindle actuator, a compensating spring intermediate the spindle and actuator for transmitting the forward movement of the actuator to the spindle to advance said spindle to a work engaging position, and an abutment on the spindle adapted to be engaged during the rearward movement of said actuator to positively retract the spindle.

20. In a device of the nature disclosed comprising a tail-stock having a longitudinally adjustable dead spindle, a reciprocating spindle actuator, a compensating spring intermediate the spindle and actuator for transmitting the forward movement of the actuator to the spindle to advance said spindle to a work engaging position, means for clamping the spindle in work engaging position, and an abutment on the spindle adapted to be engaged during the rearward movement of said actuator to positively retract the spindle.

21. In a device of the nature disclosed comprising a head-stock having a live center and a tail-stock having a dead center, an actuating member for the dead center having a predetermined stroke and a compensating means intermediate the dead center and said actuating member adapted to frictionally support a piece of work between the centers and to compensate for differences in lengths of movement of the dead center toward the live center, dependent upon different lengths of work pieces and relative to the predetermined stroke of the actuating member.

22. In a device of the class described, a tail-stock, a longitudinally adjustable spindle, a uniform stroke actuator, a compensating mechanism intermediate the spindle and actuator having relative longitudinal automatic movement, and means for reciprocating said actuator.

23. In a device of the class described, a tail-stock, a longitudinally movable spindle having a rearwardly projected stem formed with an abutment end, a reciprocating actuator in the tail-stock movable relative to the stem, and a spring on said stem intermediate the spindle and actuator.

24. In a device of the class described, in combination with a head and tail-stock and their live and dead spindle centers, a work dog engaging device to be translated relative to the live spindle while in motion, means for longitudinally adjusting the tail-stock spindle, means for clamping the said spindle in adjusted position, and a single control coördinated mechanism for first adjusting the spindle, second, clamping it, and third, engaging the dog for securing work, and transposing said sequence for releasing.

25. In a device of the class described, in combination with a head-stock and its driven spindle, and with a tail-stock having a longitudinally adjustable spindle, a work dog engaging device, shifting means therefor, means for shifting the tail-stock spindle, and means for locking said spindle, a common actuating mechanism, and coördinated motion transmission devices controlled by said actuating mechanism for sequentially functioning the dog engaging and tail-stock positioning means.

26. In a device of the class described comprising a head-stock and its live spindle, a tail-stock and its longitudinally adjustable dead spindle, a work engaging member fixed to rotate with and reciprocate longitudinally of the live spindle, means for locking the dead tail-stock spindle, and means for coördinately adjusting the work engaging member and for locking the dead tail-stock spindle.

In witness whereof, I hereunto subscribe my name, as attested by the two subscribing witnesses.

WILLIAM L. SCHELLENBACH.

Witnesses:
    EMMA SPENER,
    L. A. BECK.